July 16, 1957 W. J. VAN ROSSEM 2,799,054
PREPARATION OF REVERSIBLE HYDROCOLLOID IMPRESSIONS
Original Filed Feb. 10, 1953 2 Sheets-Sheet 1

INVENTOR.
Walter J. van Rossem.
BY Knight & Rodgers
ATTORNEYS.

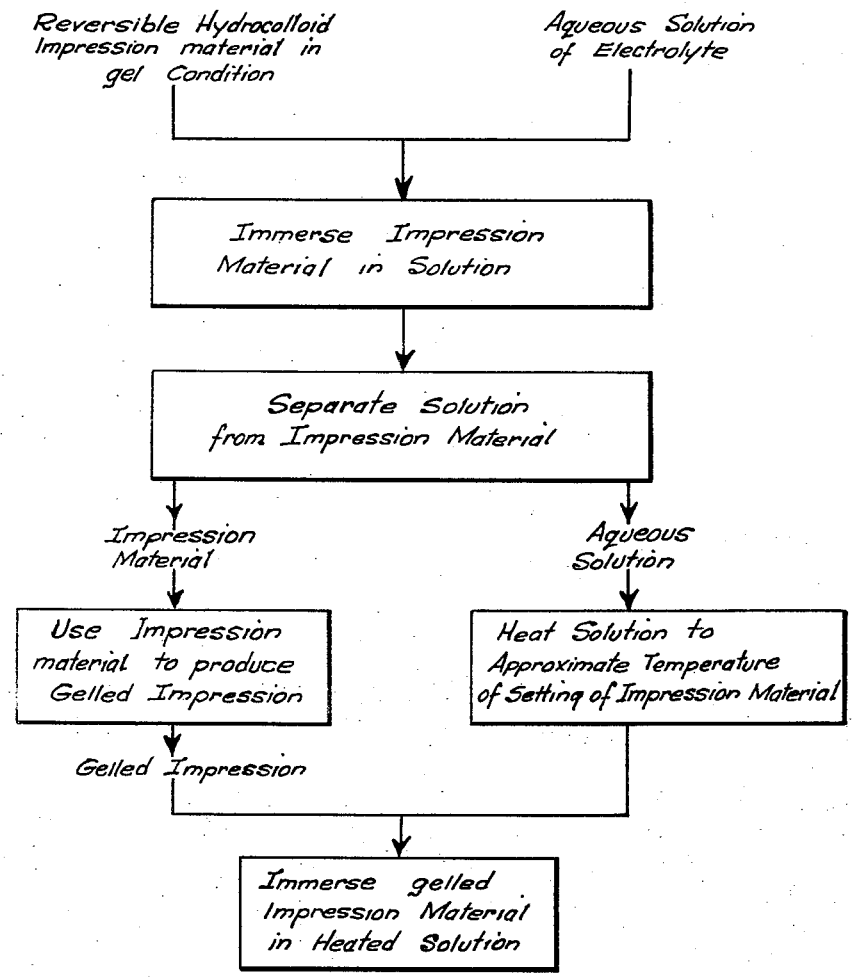

United States Patent Office 2,799,054
Patented July 16, 1957

2,799,054

PREPARATION OF REVERSIBLE HYDRO-
COLLOID IMPRESSIONS

Walter J. van Rossem, Los Angeles, Calif.

Original application February 10, 1953, Serial No. 336,085, now Patent No. 2,729,328, dated January 3, 1956. Divided and this application July 11, 1955, Serial No. 521,309

1 Claim. (Cl. 18—55.1)

This invention relates to reversible hydrocolloid impression materials and the use thereof in producing remolded bodies or impressions, and more particularly to procedures in which a reversible hydrocolloid gel impression of an object is used as a mold for forming a reproduction or model of such object.

This application is a division of my application Serial No. 336,085, filed February 10, 1953, now Patent No. 2,729,328, issued January 3, 1956.

The principal object of the invention is to provide certain improvements in the procedure of using such impression materials, whereby an extremely accurate reproduction or model of an object may be produced.

A particular object of the invention is to provide an advantageous method of forming an aqueous solution that is in isotonic balance or equilibrium with a body of reversible hydrocolloid impression material, for use in controlling the behavior of a mold or impression formed of such material.

The improvements in accordance with this invention are particularly useful in the field of dentistry, in procedures for producing models that accurately reproduce one or more teeth or an entire dental arch. Such models are used for making dental inlays or other preparations, and it is therefore of utmost importance and advantage to produce a model that reproduces accurately the dental arch or a portion thereof particularly in making inlays, fixed bridges, or precision attachment types of removable cases, where extremely high fidelity of reproduction is required.

Reversible hydrocolloid impression materials used in dental work usually contain an agar-agar base comprising an aqueous suspension of agar-agar which is in gel condition at ordinary temperatures and is "reversible" upon changes in temperature. The most satisfactory gel-forming material is agar-agar derived from the Gelidium algae or seaweed, which forms a gelatinous aqueous suspension that melts or changes to the sol condition at approximately 200° F. and sets or changes back to the gel condition at approximately 100° F.

Various dental impression compositions having an agar-agar gel base have been developed. Examples of such compositions which may be employed in the practice of the present invention are described in United States Patents Nos. 2,021,059, 2,234,383 and 2,265,118.

When such a reversible hydrocolloid material in gel form is placed in water, the gel tends to take up or imbibe additional water and to expand, the volume of the gel depending upon the water content of the gel. The tendency of the gel to imbibe water and swell is influenced by the presence of dissolved electrolytes in the gel and in the water. Consequently, the water content and volume of a reversible hydrocolloid gel mold or impression of an object to be reproduced may be controlled by immersing it in a solution of a suitable electrolyte. If the water content is properly controlled, the volume of the gelled impression can be controlled accurately so that it can be used to produce a model that reproduces accurately the exact configuration and dimensions of the original object.

In accordance with the present invention I form an aqueous solution containing a suitable electrolyte, and immerse a body of reversible hydrocolloid impression material in this solution for a sufficient period to establish a substantially complete equilibrium or balance between the impression material and the solution, with respect to both the water content of the material and the concentration of electrolyte. The aqueous solution is then substantially isotonic with respect to the hydrocolloid gel, that is, the osmotic pressures of the solution and the aqueous liquid phase of the gel are equal.

The body of impression material is then removed from the isotonic solution and is melted by heating and used to make an impression or mold of the object to be reproduced, and then cooled to gel the impression, all in the usual manner. The gelled impression or mold is then immersed in the isotonic solution formed as described above, for the purpose of controlling the physical dimensions of the impression so it can be used to produce a model that is an accurate reproduction of the object from which the impression was taken.

In order to facilitate carrying out this procedure, I prefer to provide a package containing one or more bodies of impression material and also containing a suitable quantity of electrolyte for preparing the aqueous solution. One form of such a package, and the method of the present invention, are illustrated in the accompanying drawings, in which:

Fig. 3 is a flow sheet indicating the principal steps in a preferred practice of the invention.

Figure 1:
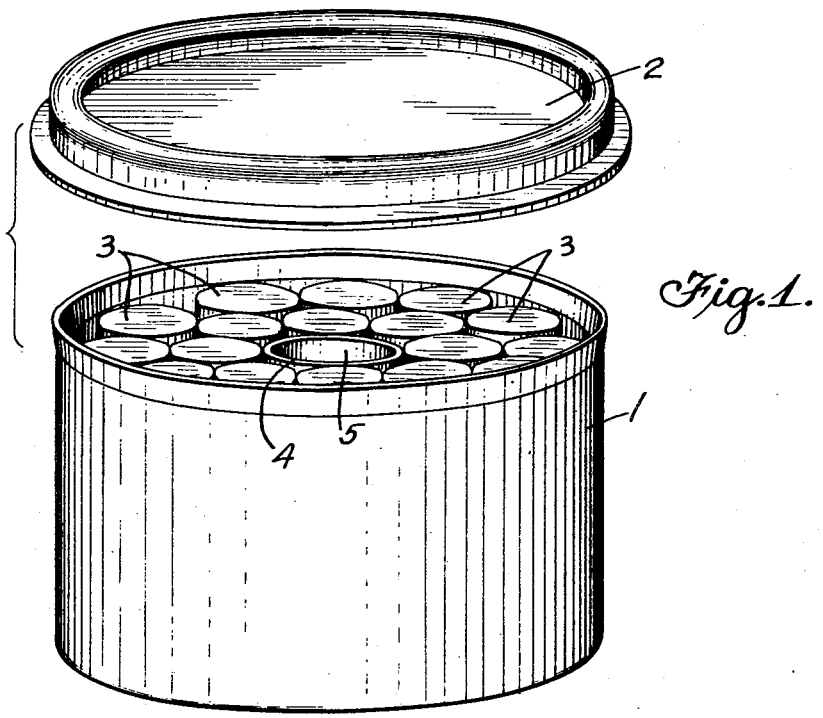
Fig. 1 is a perspective view of a package, with the cover removed.

The form of package illustrated comprises an open top container 1 which may be of cylindrical or any other suitable shape, provided with a removable cover 2 adapted to fit over the container in sealing relation thereto. The container and lid may be of any suitable material, but are preferably formed of plastic material such as polyethylene, the cover being formed to fit tightly and provide a substantially fluid-tight seal.

Within the container are packed a plurality of bodies of reversible hydrocolloid impression material, for example, a composition having an aqueous agar-agar gel base such as described in the above mentioned patents.

Such impression compositions generally contain one or more other materials incorporated with the agar-agar gel for the purpose of imparting desirable characteristics to the composition. In some cases, the composition contains a small proportion such as about 1% to 2% of an electrolyte, for the purpose of improving or controlling the setting and hardening of plaster or stone compositions in contact with the impression or for some other purpose. The present invention is applicable to reversible hydrocolloid impression compositions that either contain or do not contain such an electrolyte.

The bodies of impression material, indicated at 3, may be in the form of cylindrical sticks as shown in the drawings, or may be rods or pieces of any suitable shape and size. They preferably do not completely fill the container 1, so as to leave surplus space within the container for the addition of water.

In order to hold the bodies 3 in place in the container, I have shown a cylindrical member 4, such as a tube of plastic material, disposed centrally of the container. The bodies 3 are packed around the member 4 which defines a space 5 within the container, inside the member 4, that is not occupied by the bodies 3 of impression material. This provides extra or surplus space within the container, in addition to the spaces between the bodies 3, so that a substantial quantity of water may be placed in the container to form a solution therein as described hereinafter.

There is also placed within the container a small quantity of a water soluble inorganic salt or electrolyte which will dissolve in the water added to the container to form a solution containing a suitable concentration of dissolved electrolyte. This electrolyte is preferably a substantially neutral salt and must be one that has no adverse effect on the hydrocolloid gel. When the hydrocolloid impression is to be used in the production of a model of dental plaster or stone comprising calcium sulphate, the salt used to form the solution in the container is preferably one that reduces the solubility of calcium sulphate in water and will therefore cause the stone model to have a harder, smoother surface. Examples of salts that may be used for this purpose are sodium chloride, potassium sulphate, or magnesium sulphate.

Figure 2:
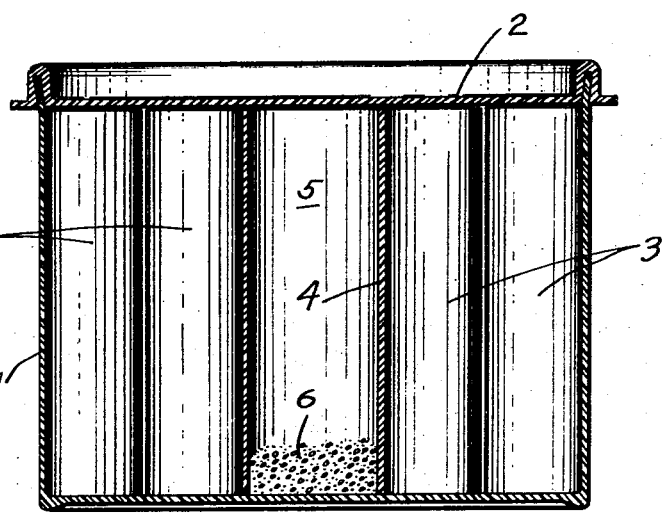
Fig. 2 is a vertical section thereof with the cover in closed position.

The desired quantity of such salt, preferably in finely divided condition, may either be placed loosely in the container, for example within the tubular member 4 as indicated at 6 in Fig. 2, or may be placed in a separate inner container disposed within the container 1 so as to be accessible for use when the lid 2 is removed.

The quantity of such salt placed in the container is such that when it is dissolved in water in the container and the impression material bodies 3 are kept immersed in the resulting solution until an isotonic balance is established, the concentration of electrolyte in the solution will be in the neighborhood of 1% to 2% by weight. The impression material itself contains a high proportion of water and, as noted above, may or may not also contain a small proportion of electrolyte. The amount of salt placed in the container will therefore depend in part upon the composition of the impression material and particularly upon the proportion of electrolyte, if any, that is present in such composition. If the bodies of impression composition in the package contain little or no electrolyte, the quantity of salt placed in the package as indicated for example at 6 should be in the neighborhood of 1 to 2% of the combined weight of the water in the impression material bodies 3 and the water that is to be added to the container to provide a solution for immersing said bodies. If the impression composition as supplied in the package contains some electrolyte, the amount of electrolyte placed in the container in addition to the impression material bodies 3 may be correspondingly reduced because the electrolyte in the impression material will provide part of the amount required to produce the desired concentration in both the solution and the impression material when the condition of isotonic balance or equilibrium is established as described hereinafter. Since the desired concentration under such equilibrium conditions is in the neighborhood of 1% to 2%, it will be seen that if the impression material of which the bodies 3 are formed contains about that proportion of electrolyte, the quantity of salt placed in the container may be only about 1% to 2% of the weight of water that is to be added to the container to form a sufficient quantity of aqueous solution to immerse the bodies 3.

The principal steps of a preferred embodiment of the method of preparing impressions in accordance with this invention are illustrated in Fig. 3. In using the above described package in the practice of this method, the cover 2 is removed from the container, and the tubular member 4 is preferably also removed, leaving the space 5 free and exposed to the impression material bodies 3, so that ample space is provided within the container for addition of a substantial quantity of water. If the salt is enclosed in a separate inner container, the latter is also opened and the contents emptied into the container 1.

Sufficient water is then added to the container 1 to dissolve the salt and to completely cover or immerse the bodies 3 of impression material in the resulting aqueous solution of electrolyte. The dissolution of the salt 6 may, if desired, be promoted by stirring the water.

The salt 6 is dissolved in the added water, and the impression material bodies 3 are maintained immersed in the resulting solution in the container for a sufficient time to allow the solution and the dissolved electrolyte to penetrate the impression material and bring it into substantially complete isotonic balance with the solution. This penetration takes place at the rate of about ⅛ inch per hour, so that the desired equilibrium is established within a few hours. The time that should be allowed is dependent upon the dimensions of the sticks or other bodies of impression material. When using cylindrical sticks of about 1 inch diameter, a period of about five or six hours is generally sufficient, but longer periods may be used if desired. The impression material in the sticks or bodies 3 is then in substantially completely equilibrium with the solution, in respect to both the water content of the hydrocolloid gel and the concentration of electrolyte.

The establishment of the desired condition of substantial isotonic balance between the impression material and the aqueous solution may be facilitated by forming the impression material bodies 3 of a composition containing a small proportion such as about 1% to 2% of the same electrolyte or salt that is placed in the container as indicated for example at 6. In that case, as noted above, the amount of such salt placed in the container 1 may be about 1% to 2% of the weight of water added to the container to immerse the bodies 3. The initial concentration of the electrolyte in the resulting solution therefore approximates the initial concentration in the impression material, thus reducing the time required to establish substantially complete isotonic balance by diffusion or transfer of electrolyte between the impression material and the solution.

The isotonic solution formed in the container as described is then separated from the impression material and is preferably transferred to a separate container for use as described hereinafter. The bodies of impression material may be stored or kept in the container 1 until they are to be used, and the cover 2 is preferably replaced on the container 1 to close it and prevent loss of water from the impression material by evaporation.

When an impression or mold is to be made, a suitable quantity of the impression material is removed from the container 1 and is used to produce a gelled impression by the usual procedure of melting the impression material in a suitable dispensing device, bringing it into contact with the object to be reproduced, then cooling to gel the material, and removing the gelled impression.

The impression, preferably immediately after removal from the object following setting, is then immersed in the isotonic solution that has been prepared and transferred to a separate container as described above.

The temperature at which the impression material sets or gels in making the impression is approximately 100° F., although the impression is generally cooled to substantially lower temperature in order to cause complete solidification within a reasonable time. If the isotonic solution in which it is immersed following removal from the object is at ordinary room temperature, immersion therein for about 20 to 30 minutes causes the gelled impression to imbibe a small quantity of water from the solution, the quantity of water so imbibed into the gel being only sufficient to compensate for the thermal contraction of the liquid phase thereof in cooling from the setting temperature to that of the solution. Thus, the volume of the gelled mass is controlled accurately with respect to its volume at the time of setting in contact with the object to be reproduced, and no stresses are created therein tending to cause warping or distortion of the mold.

The mold prepared as described above may therefore be used to produce a cast model of dental stone or plaster or other suitable material, which reproduces the configuration and dimensions of the original object with extreme accuracy.

The use of this procedure makes it possible to produce a finished stone model that reproduces the original object with a maximum variation of much less than one-thousandth of an inch in all dimensions. The fidelity of reproduction that may be attained is so great that any variations in dimensions between the original object and the model are measurable only in ten-thousandths of an inch and a fidelity as great as one ten-thousandth of an inch can readily be obtained with proper care and under good conditions.

According to a preferred practice of the invention, the gelled impression following removal from the object to be reproduced is immersed in the above described isotonic solution while the solution is at approximately the setting temperature at which the impression was gelled. This setting temperature varies slightly with the type of agar-agar, but is normally about 100° F. with agar-agar compositions employed in dentistry, such as those described in the above mentioned patents. I therefore preferably employ a water bath for maintaining the isotonic solution at the desired temperature.

In this preferred procedure, the isotonic solution in a suitable container is placed on the water bath to heat it to the desired temperature of approximately 100° F. The solidified impression is placed in the solution and is kept immersed therein while maintaining the solution at that temperature. As soon as the temperature becomes equalized throughout the mass of the gelled impression, the water content thereof reaches equilibrium with the isotonic solution. About 5 minutes' immersion is generally sufficient. Since the temperature of the gelled mass remains substantially constant and approximately that at which setting of the gel occurred, there is substantially no change in water content or volume thereof due to temperature change. If the impression is kept at that temperature until it is used in making the stone or plaster model, the setting of the model is accelerated and an improved result is obtained in the finished model.

Another advantage of this preferred procedure is that the impression can be kept for any desired period without change of volume or water content, as long as it is maintained in the isotonic solution and the temperature remains substantially constant. This is of great advantage since it is often impossible for a dentist to make the model within a short period after the impression is taken from the patient's mouth.

I claim:

The method of preparing an impression of an object to be reproduced which comprises: preparing an aqueous solution containing a small proportion of an electrolyte; immersing in said solution a body of reversible hydrocolloid impression material in the gel condition, to establish substantially complete equilibrium between said material and the solution, with respect to the water content of said material and the concentration of said electrolyte, and thereby make the solution substantially isotonic with respect to said material; separating the isotonic solution from the impression material; using said impression material to produce an impression of an object by a procedure involving melting of such material and subsequent cooling to cause setting thereof and form a gelled impression; and thereafter immersing the gelled impression in said isotonic solution while heating the solution to maintain it at approximately the temperature of setting of said impression material, for a period sufficient to establish equilibrium between the impression and the solution.

References Cited in the file of this patent

UNITED STATES PATENTS

| | | |
|---|---|---|
| 2,315,748 | Thompson | Apr. 6, 1943 |
| 2,390,138 | Vallandigham | Dec. 4, 1945 |
| 2,599,573 | Milton et al. | June 10, 1952 |